United States Patent
Pribisic

(10) Patent No.: US 9,461,521 B2
(45) Date of Patent: Oct. 4, 2016

(54) WINDOW REGULATOR MOTOR ASSEMBLY HAVING A CIRCUIT BOARD AND MOTOR CONTROL CONNECTOR

(75) Inventor: Mirko Pribisic, North York (CA)

(73) Assignee: Magna Closures Inc, Newmarket, Ontario (CA)

( * ) Notice: Subject to any disclaimer, the term of this patent is extended or adjusted under 35 U.S.C. 154(b) by 613 days.

(21) Appl. No.: 13/882,242

(22) PCT Filed: Oct. 28, 2011

(86) PCT No.: PCT/CA2011/001203
§ 371 (c)(1),
(2), (4) Date: Apr. 29, 2013

(87) PCT Pub. No.: WO2012/055032
PCT Pub. Date: May 3, 2012

(65) Prior Publication Data
US 2013/0221775 A1   Aug. 29, 2013

Related U.S. Application Data

(60) Provisional application No. 61/408,122, filed on Oct. 29, 2010.

(51) Int. Cl.
*H02K 11/00* (2016.01)
*H02K 5/22* (2006.01)
*E05F 15/697* (2015.01)

(52) U.S. Cl.
CPC .............. *H02K 5/225* (2013.01); *E05F 15/697* (2015.01); *H02K 11/38* (2016.01); *E05Y 2900/55* (2013.01)

(58) Field of Classification Search
CPC ............. H02K 5/225; H02K 11/0084; H02K 2211/03; H02K 11/0021; H02K 11/00; H02K 5/22; E05F 15/697; E05F 15/632; E05Y 2900/55
See application file for complete search history.

(56) References Cited

U.S. PATENT DOCUMENTS

| | | | |
|---|---|---|---|
| 5,351,439 A | 10/1994 | Takeda et al. | |
| 6,107,713 A * | 8/2000 | Hulsmann | H02K 5/225 310/112 |
| 6,756,711 B2 * | 6/2004 | Matsuyama | H02K 5/225 310/68 B |
| 6,903,473 B2 | 6/2005 | Matsuyama et al. | |
| 7,279,817 B2 * | 10/2007 | Adachi | H02K 5/225 310/71 |
| 2002/0016087 A1 | 2/2002 | Breynaert et al. | |
| 2004/0012279 A1* | 1/2004 | Ursel | G01D 5/145 310/75 R |
| 2004/0027013 A1 | 2/2004 | Aab et al. | |
| 2004/0061391 A1 | 4/2004 | Matsuyama et al. | |
| 2007/0018517 A1* | 1/2007 | Huck et al. | 310/71 |
| 2008/0252159 A1* | 10/2008 | Huck et al. | 310/71 |
| 2009/0121578 A1* | 5/2009 | Benkert | 310/239 |
| 2009/0146510 A1 | 6/2009 | Uchimura | |

FOREIGN PATENT DOCUMENTS

| | | |
|---|---|---|
| CA | 2610798 | 12/2006 |
| EP | 0538495 | 7/1991 |

* cited by examiner

*Primary Examiner* — Burton Mullins
(74) *Attorney, Agent, or Firm* — Miller Canfield

(57) ABSTRACT

A window regulator motor assembly has an electric motor, a worm, a gear and a controller. The motor has an end face and an output shaft extending outwardly from the end face. The motor further includes a connector extending outwardly from the end face spaced from and generally parallel to the output shaft. The worm is on the output shaft and is driven by the motor. The gear is driven by the worm. The controller includes a circuit board positioned between the output shaft and the motor connector. A motor control connector extends from a first face of the circuit board and engages the motor connector. A speed sensor is on the second face of the circuit board and faces the output shaft.

7 Claims, 8 Drawing Sheets

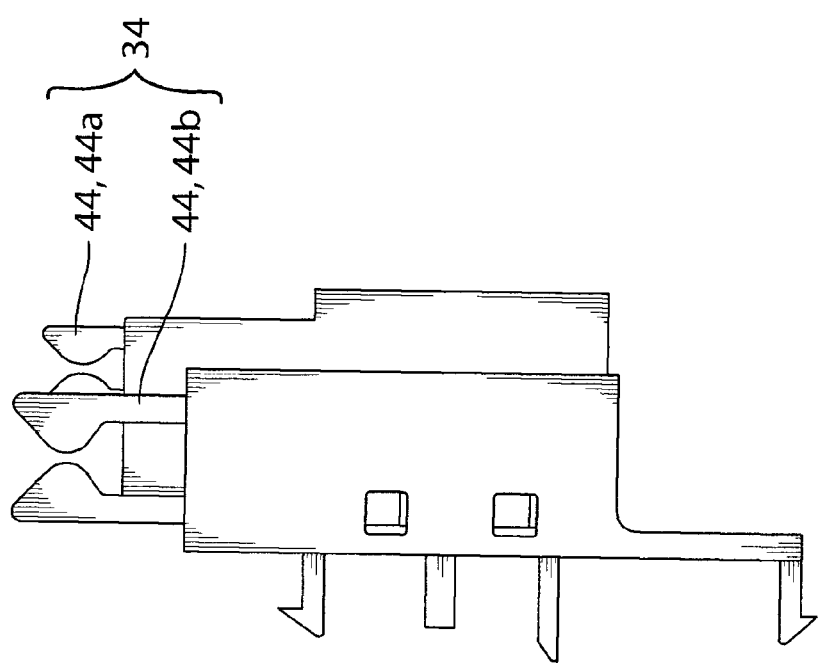

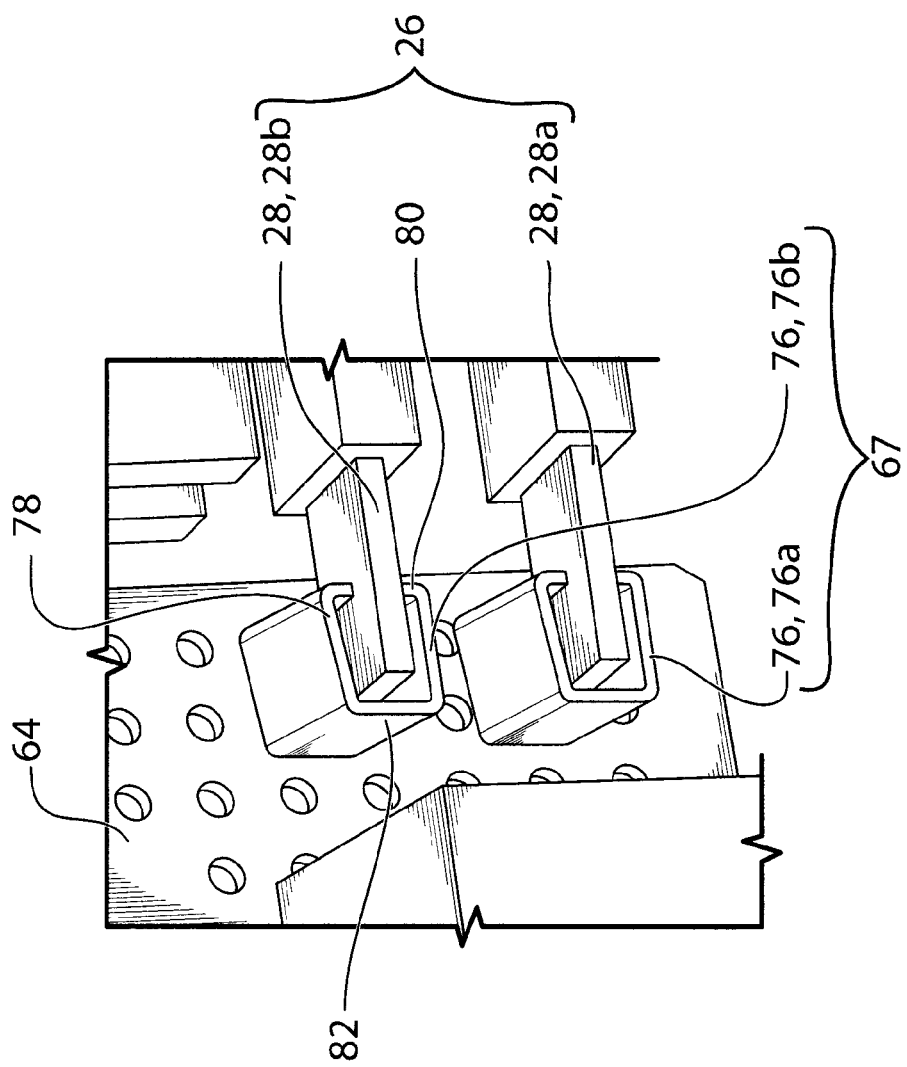

WINDOW REGULATOR MOTOR ASSEMBLY HAVING A CIRCUIT BOARD AND MOTOR CONTROL CONNECTOR

CROSS REFERENCE TO RELATED APPLICATIONS

This application is a national phase application and claims the benefit, under 35 U.S.C. §371, of PCT/CA2011/01203, filed on Oct. 28, 2011, which in turn claims the priority of U.S. Provisional Application No. 61/408,122, filed on Oct. 29, 2010.

FIELD OF THE INVENTION

The present invention relates to window regulator motor assemblies.

BACKGROUND OF THE INVENTION

Vehicular window regulators are typically powered by a motor assembly that includes a motor, a worm that is driven by the motor, a gear that is driven by the worm, and a controller, which may be referred to as an ECU. The ECU includes a circuit board, a motor connector for connecting to the motor, and a sensor for sensing the rotation of the motor. In some cases, the circuit board has an L-shape and the overall ECU occupies a relatively large space. Additionally, some other issues with some window regulator motor assemblies relate to cost, reliability and sensitivity to shock (eg. when the vehicle hits a bump).

It would be advantageous to be able to provide a window regulator motor assembly that at least partially address one or more of the above noted issues.

SUMMARY OF THE INVENTION

In a first aspect, the invention is directed to a window regulator motor assembly in which the controller and motor are connected in a way that orients the circuit board of the controller to be parallel to the output shaft of the motor. In a preferred embodiment, the circuit board is positioned between a connector on the motor and the output shaft.

In a further preferred embodiment the invention is directed to a window regulator motor assembly for a window regulator for a vehicle, including an electric motor, a worm, a gear and a controller. The electric motor has an end face and an output shaft extending outwardly from the end face. The electric motor further includes a motor connector extending outwardly from the end face spaced from and generally parallel to the output shaft. The worm is on the output shaft and is driven by the electric motor. The gear is driven by the worm. The controller includes a circuit board, a speed sensor and a motor control connector. The circuit board is positioned between the output shaft and the motor connector. The controller connector extends from a first face of the circuit board and engages the motor connector. The speed sensor is on the second face of the circuit board and faces the output shaft.

In another aspect, the invention is directed to a window regulator motor assembly including, among other things, a controller and a motor. The motor has a motor connector that optionally includes two prongs. The controller includes a circuit board that has a motor control connector. The motor control connector connects to the motor connector. The motor control connector extends perpendicularly to the motor connector. Optionally the motor control connector includes two prong receivers, each of which may include a first jaw, a second jaw and a biasing portion that biases the first and second jaws towards each other. The prong receivers may receive the distal ends of the prongs. Optionally each prong receiver is unitary and has a generally C-shaped cross-sectional shape. The prong receivers optionally extend perpendicularly to the circuit board.

BRIEF DESCRIPTION OF THE DRAWINGS

The present invention will now be described by way of example only with reference to the attached drawings, in which:

FIG. 4 is a side elevation view of a controller connector that is part of the controller shown in FIG. 3;

FIG. 7 is a perspective view showing the connection between the controller and the motor shown in FIG. 6.

DETAILED DESCRIPTION OF THE INVENTION

Figure 1:
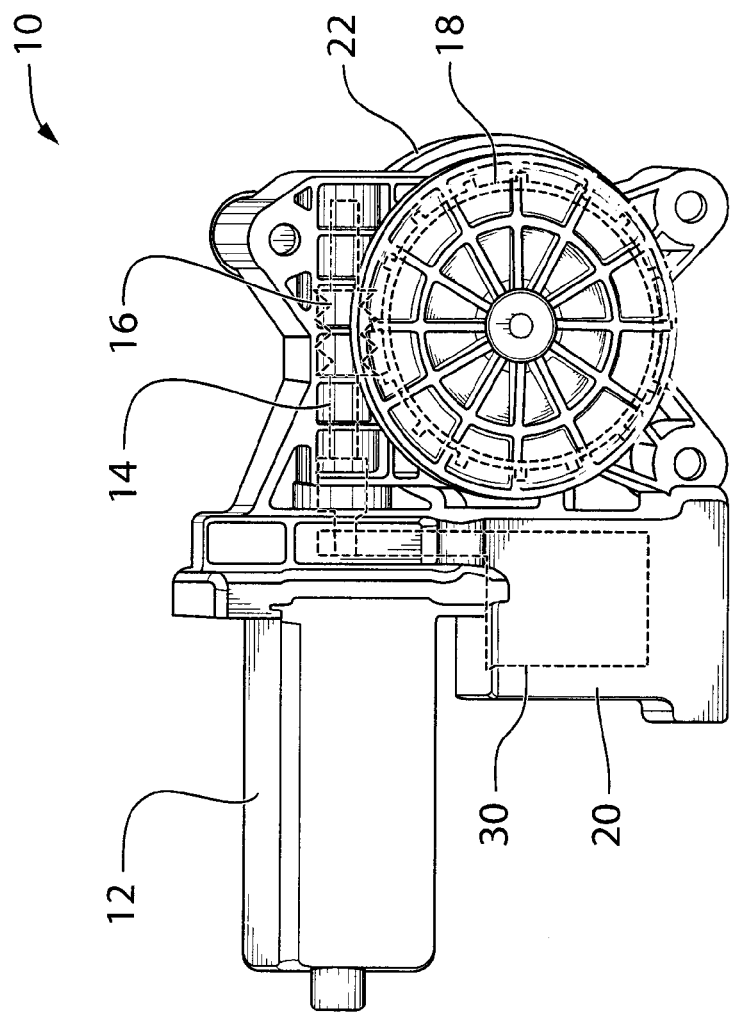
FIG. 1 is a perspective view of a window regulator motor assembly in accordance with the prior art.

Reference is made to FIG. 1, which shows a window regulator motor assembly 10 in accordance with the prior art. The window regulator motor assembly 10 includes a motor 12 having an output shaft 14, a worm 16 on the output shaft 14, a gear 18 driven by the worm 16, a controller 20 for controlling the motor 12, and a housing 22.

Figure 2:
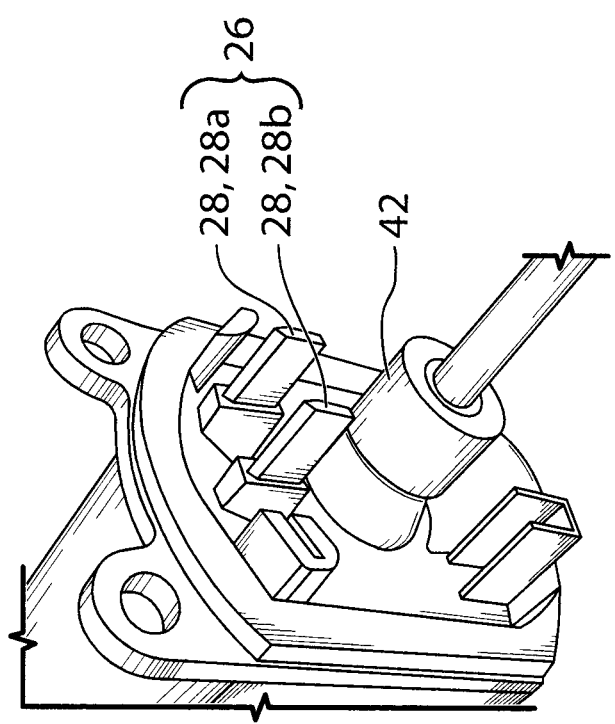
FIG. 2 is a perspective view of a motor from the window regulator motor assembly shown in FIG. 1.

The motor 12 is shown more clearly in FIG. 2. The motor 12 has an end face 24 from which the output shaft 14 extends. The motor 12 further includes a motor connector 26 for connecting to the controller 20. In the embodiment shown, the motor connector 26 also extends from the end face 24 and is parallel to and spaced from the output shaft 14. The connector 26 may be made up of two prongs 28, shown individually at 28a and 28b.

Figure 3:
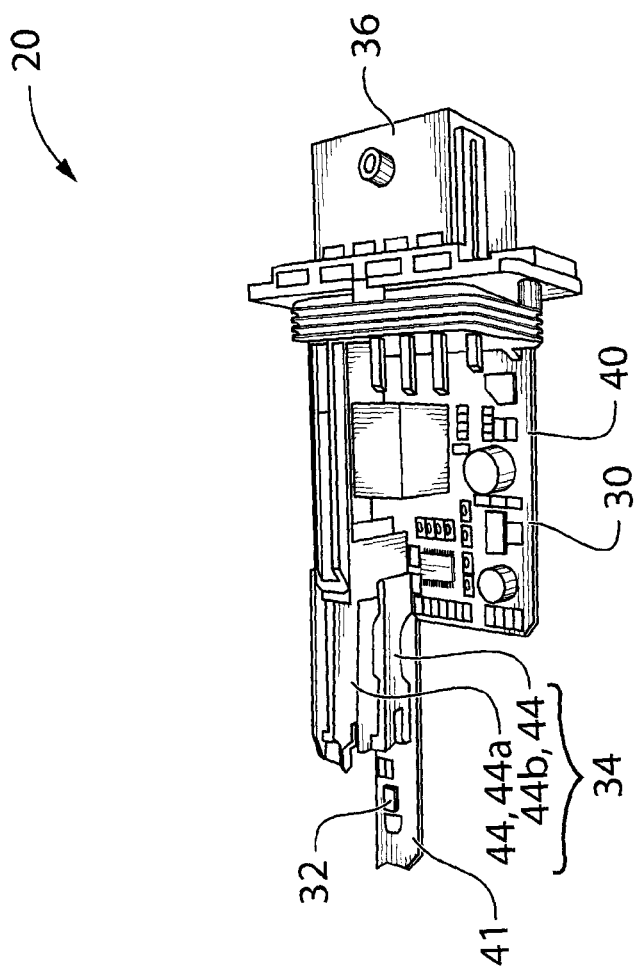
FIG. 3 is a perspective view of a controller from the window regulator motor assembly shown in FIG. 1.

Referring to FIG. 3, the controller 20 includes, among other things, a circuit board 30, a speed sensor 32 on the circuit board 30, a motor control connector 34 for connecting to the motor connector 26, and a vehicle connector 36. The circuit board 30 is shaped generally in an L-shape including a main portion 40 and an extension portion 41. The main portion 40 is positioned in the open space between the motor 12 and the gear 18 (FIG. 1), and houses several components including the vehicle connector 36. The extension portion 41 extends from the main portion 40 up to the output shaft 14. The speed sensor 32 (eg. a Hall-effect sensor) is positioned at the distal end of the extension portion 41, and is positioned so as to be able to sense a magnet 42 (FIG. 2) that is positioned on the output shaft 14.

Figure 3A:
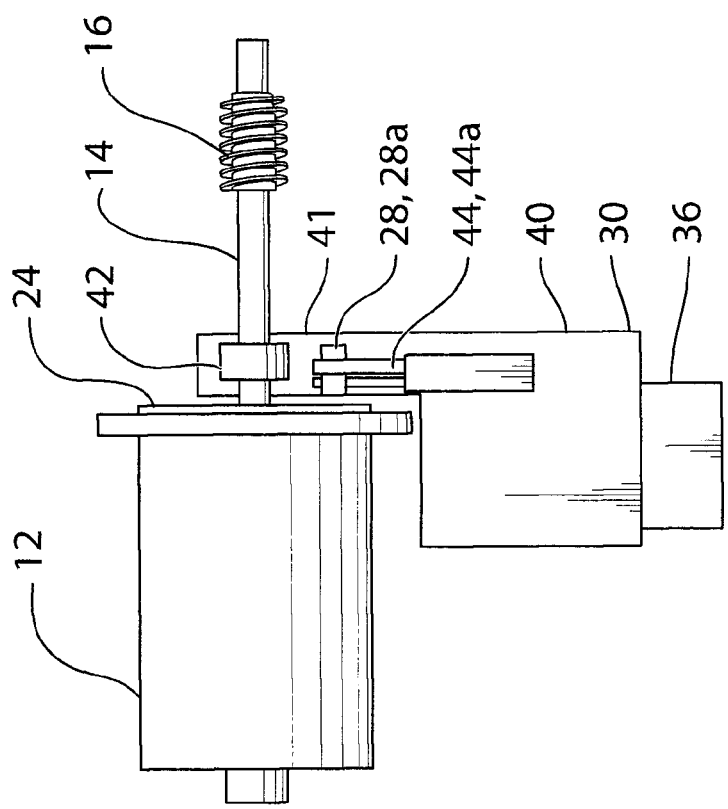
FIG. 3a is a plan view of the controller shown in FIG. 3 connected with the motor shown in FIG. 2.

The motor control connector 34 extends along the extension portion 41 and connects to the motor connector 26 (FIG. 2). The motor control connector 34 shown includes two prong receivers 44, shown individually at 44a and 44b shown more clearly in FIG. 4. The prong receivers 44a and 44b extend generally perpendicularly to the prongs 28a and 28b, (see FIG. 3a) but are generally parallel to the circuit board 30 (FIG. 3).

The window regulator motor assembly 10 shown in FIGS. 1-4, and the controller 20 in particular, take up a large amount of room. Additionally, the L-shape of the circuit board is relatively expensive as compared to a circuit board 30 having a more standard shape, such as a rectangular shape. Furthermore, the shape of the circuit board 30 and the configuration of the prong receivers 44a and 44b may be relatively sensitive to shock during use of the vehicle (eg. when the vehicle hits a bump while driving).

Figure 5:
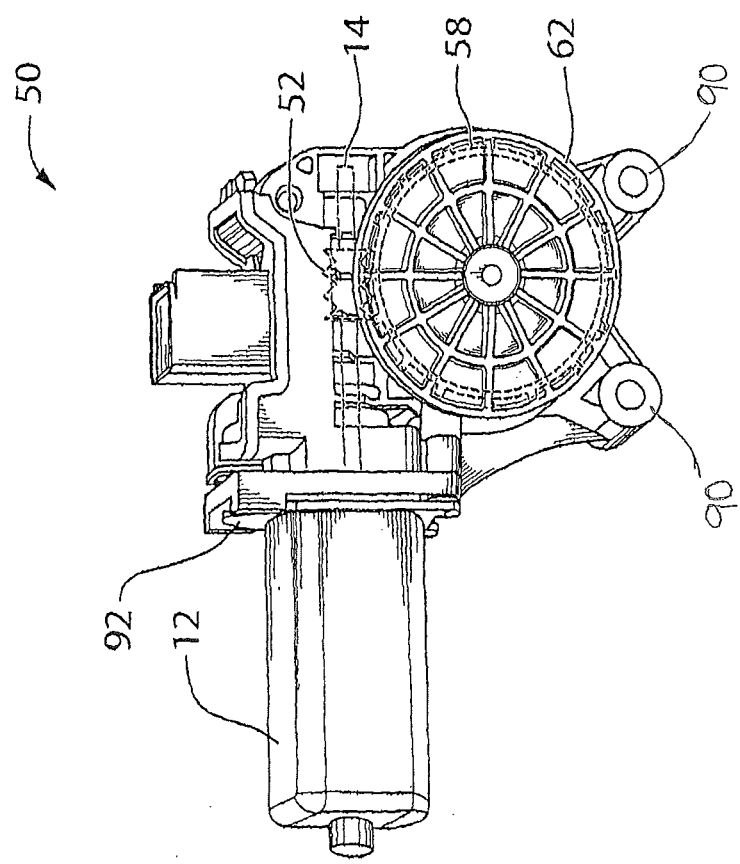
FIG. 5 is a perspective view of a window regulator motor assembly in accordance with an embodiment of the present invention.

Reference is made to FIG. 5, which shows a window regulator motor assembly 50, in accordance with an embodiment of the present invention. The window regulator motor assembly 50 includes the motor 12 with the output shaft 14 (FIG. 6), a worm 52 (FIG. 6) on the output shaft 14, a gear 58 (FIG. 6) driven by the worm 52, a controller 60 (FIG. 6) for controlling the motor 62, and a housing 62 (FIG. 5).

Figure 6:
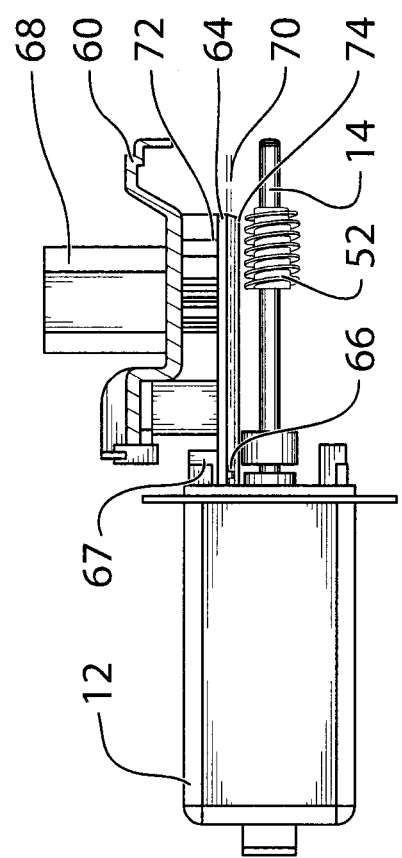
FIG. 6 is a perspective view of a motor and a controller from the window regulator motor assembly shown in FIG. 5.

Referring to FIG. 6, the controller 60 includes, among other things, a circuit board 64, a speed sensor 66 on the circuit board 64, a motor control connector 67 for connecting to the motor connector 26, and a vehicle connector 68. The circuit board 64 is shaped generally in a rectangular shape, having a longitudinal axis 70. In the embodiment shown, the circuit board 64 is positioned parallel to the output shaft 14 and to the motor connector 26. The circuit board 64 has a first face 72 and a second face 74. The motor control connector 67 extends from the first face 72 and comprises two prong receivers 76 (FIG. 7), shown individually at 76a and 76b, for receiving the prongs 28a and 28b. The prong receivers 76a and 76b extend upwards from the circuit board 64 generally perpendicular to the circuit board 64 and generally perpendicular to the prongs 28a and 28b. Each prong receiver 76 may be generally C-shaped in cross-section and has a first jaw 78, a second jaw 80 and a biasing portion 82 that biases the first and second jaws 78 and 80 to clamp onto one of the prongs 28. Some lead-in is provided on the jaws 78 and 80 to facilitate their spreading when the prong receivers 76 receive the prongs 28.

It will be noted that the prong receivers 76, which extend directly out from the circuit board 64 to receive the prongs 28, do not require overmolding. This is at least in part due to their relatively small size, which is a direct result of the orientation and position of the circuit board 64. As a result, they are less expensive and smaller than the prior art motor control connector 34 shown in FIG. 4.

The vehicle connector 68 is, in the embodiment shown, provided on the first face 72 of the circuit board 64, and connects the controller 60 to one or more other components in the vehicle.

The speed sensor 66 is positioned on the second face 74 of the circuit board 64 and faced the output shaft 14 of the motor 12. The speed sensor 66 may be any suitable type of sensor, such as a Hall-effect sensor, and may be positioned to sense a magnet such as magnet 42 on the output shaft 14. Positioning the speed sensor 66 on the second face 74 of the circuit board 64 while positioning the controller connector 67 on the first face 72 permits the circuit board 64 to be positioned between the motor connector 26 and the output shaft 14 and permits the circuit board 64 to extend generally parallel to the output shaft 14. This, in turn, permits the circuit board 64 to be provided with a rectangular shape instead of an L-shape. A rectangular circuit board is generally more advantageous for several reasons. One reason is that it can be less expensive to manufacture. Furthermore, the rectangular shape is less prone to fracture from shocks sent through the assembly during use of the vehicle (eg. when the vehicle hits a bump when being driven). Furthermore, the width of the circuit board 64 (which is now not restricted in the way that the width of the extension portion 41 shown in FIG. 3 is restricted) and the configuration of the prong receivers 76 whereby they extend upward directly from the circuit board 64 to engage the ends of the prongs 28 makes the connection between the motor connector 26 and the controller connector 67 robust and resistant to momentary disengagement from shock when the vehicle hits a bump or the like.

It will be noted that the action of connecting the circuit board 64 to the prongs 28 is relatively easy as compared to some prior art assemblies. Further, the speed sensor 66 is relatively easily positioned in a suitable position to sense the magnet on the output shaft 14.

It will be noted that the circuit board 64, the vehicle connector 68 and the motor control connector 67 all nestle in a space between an ear 90 of the housing 62 and the motor mounting flange shown at 92. As a result, they do not significantly add to the overall 'footprint' of the motor assembly 50. By contrast, the controller 20 from the motor assembly 10 shown in FIG. 1 adds significantly to the footprint of the motor assembly 10. The more-compact footprint of the motor assembly 50 is advantageous in the relatively restricted space available inside some vehicle doors. The reduced size of the motor assembly 50 also contributes to a reduced amount of material needed for such components as the housing 62 as compared to some prior art assemblies. The reduced material cost can result in a lower cost of manufacture and a lower weight for the motor assembly 50.

While the above description constitutes a plurality of embodiments of the present invention, it will be appreciated that the present invention is susceptible to further modification and change without departing from the fair meaning of the accompanying claims.

The invention claimed is:

1. A window regulator motor assembly for a window regulator for a vehicle, comprising:
   an electric motor having an end face and having an output shaft extending outwardly from the end face, and having a motor connector extending outwardly from the end face spaced from and generally parallel to the output shaft;
   a worm on the output shaft and driven by the electric motor;
   a gear driven by the worm; and
   a controller including a circuit board, a speed sensor, a motor control connector, and a vehicle connector, wherein the circuit board is positioned between the output shaft and the motor connector, wherein the motor control connector extends from a first face of the circuit board and engages the motor connector, and wherein the speed sensor is on a second face of the circuit board, opposite the first face, and faces the output shaft, and wherein the motor connector includes a first prong and a second prong and the motor control connector includes a first prong receiver and a second prong receiver for receiving the first prong and second prong respectively, and wherein the first and second prong receivers extend outwardly from the first face of the circuit board in a direction that is generally perpendicular to the circuit board and generally perpendicular to the first and second prongs.

2. A window regulator motor assembly as claimed in claim 1, wherein the circuit board is generally rectangular and has a longitudinal axis that is generally parallel to the output shaft.

3. A window regulator motor assembly as claimed in claim 2, wherein each prong receiver has a generally C-shaped cross-sectional shape and receives a distal end of one of the prongs.

4. A window regulator motor assembly as claimed in claim 3, wherein each prong receiver is unitary and includes a first jaw portion and a second jaw portion connected together by a biasing portion that biases the first and second jaw portions to clamp onto one of the prongs.

5. A window regulator motor assembly for a window regulator for a vehicle, comprising:
- an electric motor having an end face and having an output shaft extending outwardly from the end face, and having a motor connector extending outwardly from the end face spaced from and generally parallel to the output shaft;
- a worm on the output shaft and driven by the electric motor;
- a gear driven by the worm; and
- a controller including a circuit board, a speed sensor, a motor control connector, and a vehicle connector, wherein the motor control connector extends from a first face of the circuit board and engages the motor connector, and wherein the motor control connector extends perpendicular to the motor connector and perpendicular to the circuit board, and wherein the speed sensor is on a second face of the circuit board, opposite the first face, and faces the output shaft, and wherein the motor connector includes a first prong and a second prong and the motor control connector includes a first prong receiver and a second prong receiver for receiving the first prong and second prong respectively, and wherein the first and second prong receivers extend outwardly from the first face of the circuit board in a direction that is generally perpendicular to the first and second prongs.

6. A window regulator motor assembly as claimed in claim 5, wherein each prong receiver has a generally C-shaped cross-sectional shape and receives a distal end of one of the prongs.

7. A window regulator motor assembly as claimed in claim 6, wherein each prong receiver is unitary and includes a first jaw portion and a second jaw portion connected together by a biasing portion that biases the first and second jaw portions to clamp onto one of the prongs.

\* \* \* \* \*